(12) United States Patent
Ono et al.

(10) Patent No.: US 9,176,878 B2
(45) Date of Patent: Nov. 3, 2015

(54) FILTERING PRE-FETCH REQUESTS TO REDUCE PRE-FETCHING OVERHEAD

(75) Inventors: Tarik Ono, Cupertino, CA (US); Mark R. Greenstreet, Vancouver, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 109 days.

(21) Appl. No.: 13/421,014

(22) Filed: Mar. 15, 2012

(65) Prior Publication Data

US 2013/0246708 A1 Sep. 19, 2013

(51) Int. Cl.
*G06F 12/08* (2006.01)

(52) U.S. Cl.
CPC ........ *G06F 12/0862* (2013.01); *G06F 12/0897* (2013.01); *G06F 2212/6026* (2013.01); *Y02B 60/1225* (2013.01)

(58) Field of Classification Search
None
See application file for complete search history.

(56) References Cited

U.S. PATENT DOCUMENTS

| | | | |
|---|---|---|---|
| 5,761,515 A * | 6/1998 | Barton et al. | 717/158 |
| 7,487,297 B2 * | 2/2009 | El-Essawy et al. | 711/137 |
| 7,707,360 B2 * | 4/2010 | Schmuck et al. | 711/137 |
| 7,774,578 B2 * | 8/2010 | Keltcher | 711/213 |
| 7,930,485 B2 * | 4/2011 | Fertig et al. | 711/137 |
| 8,255,633 B2 * | 8/2012 | Boyle et al. | 711/137 |
| 8,458,408 B2 * | 6/2013 | Speight et al. | 711/137 |
| 2005/0155020 A1 * | 7/2005 | DeWitt et al. | 717/130 |

OTHER PUBLICATIONS

Zhuang, Xiaotong, "Reducing Cache Pollution via Dynamic Data Prefetch Filtering", IEEE Transactions Computers, vol. 56, No. 1, Jan. 2007.

* cited by examiner

*Primary Examiner* — Gary Portka
(74) *Attorney, Agent, or Firm* — Park, Vaughan, Fleming & Dowler LLP; Mark Spiller

(57) ABSTRACT

The disclosed embodiments provide a system that filters pre-fetch requests to reduce pre-fetching overhead. During operation, the system executes an instruction that involves a memory reference that is directed to a cache line in a cache. Upon determining that the memory reference will miss in the cache, the system determines whether the instruction frequently leads to cache misses. If so, the system issues a pre-fetch request for one or more additional cache lines. Otherwise, no pre-fetch request is sent. Filtering pre-fetch requests based on instructions' likelihood to miss reduces pre-fetching overhead while preserving the performance benefits of pre-fetching.

18 Claims, 8 Drawing Sheets

FILTERING PRE-FETCH REQUESTS TO REDUCE PRE-FETCHING OVERHEAD

BACKGROUND

1. Field of the Invention

This disclosure generally relates to techniques for reducing pre-fetching overhead for processors in computer systems. More specifically, this disclosure relates to techniques for filtering pre-fetch requests to reduce cache and memory pre-fetching overhead.

2. Related Art

To achieve high instruction throughput rates, the memory subsystem of a processor typically includes multiple levels of cache memories. Accesses to such cache memories generally operate as follows. During execution, a processor may execute an instruction that references a memory location. If the referenced memory location is not available in a level one (L1) cache, a cache miss causes the L1 cache to send a corresponding request to a level two (L2) cache. Next, if the referenced memory location is also not available in the L2 cache, additional requests may need to be sent to lower levels of the processor's memory hierarchy.

In a typical high-performance processor, off-chip memory latency (e.g., to a DRAM memory) is often an order of magnitude or more larger than on-chip memory latency. Pre-fetching techniques try to hide this latency by predicting which cache lines might be needed in the future and preemptively pre-fetching those cache lines. For instance, pre-fetching operations may be initiated on a cache miss. For example, when a load instruction misses in the cache, the pre-fetch unit can predict the next few lines that might be needed, and can issue pre-fetches for those lines.

Unfortunately, while pre-fetching techniques generally reduce cache miss delays, they also involve additional overhead. Not all cache lines that are pre-fetched will be used, and such superfluous cache line reads consume memory bandwidth and can cause unnecessary energy consumption in the off-chip memory, the on-chip caches, and the memory network. Hence, what is needed are techniques for pre-fetching cache lines without the above-described problems.

SUMMARY

The disclosed embodiments provide a system that filters pre-fetch requests to reduce pre-fetching overhead. During operation, the system executes an instruction that involves a memory reference that is directed to a cache line in a cache. Upon determining that the memory reference will miss in the cache, the system determines whether the instruction frequently leads to cache misses. If so, the system issues a pre-fetch request for one or more additional cache lines. Otherwise, no pre-fetch request is sent. Filtering pre-fetch requests based on instructions' likelihood to miss reduces pre-fetching overhead while preserving the performance benefits of pre-fetching.

In some embodiments, issuing the pre-fetch request involves detecting an access pattern for additional memory references that follow the instruction.

In some embodiments, the system receives an indication (e.g., in the memory reference instruction) that indicates that the cache line is likely to miss in the cache. In other cases, the system determines that the cache line is likely to miss in the cache by using tracking data that is stored during the execution of a program.

In some embodiments, the system profiles a program executing on a processor to identify program instructions that are likely to cause cache misses.

The system analyzes this profile information to identify such instructions, and then modifies these program instructions so that they can be easily identified during execution. For instance, the system may mark a field in the program instruction that indicates that the instruction is likely to cause cache misses and should trigger a pre-fetch request for additional cache lines.

In some embodiments, the system uses one or more counters to track previous hits and misses for a memory reference. The system subsequently uses the values tracked in these counters to determine whether the memory reference frequently leads to cache misses. Such counters may include a variety of structures including, but not limited to, one or more of the following: a hit counter; a miss counter; a counter that tracks the number of times an instruction is executed; a "saturating" counter that is incremented on hits and decremented on misses; and/or an asymmetric counter that weighs hits and misses differently.

In some embodiments, the system compares a calculated value that is derived from the tracked hit and miss information with a threshold to determine whether or not to send a speculative request.

In some embodiments, the cache is part of a multi-level memory hierarchy, and in addition to sending a pre-fetch request, the system also sends a speculative request to a lower level of the multi-level memory hierarchy. More specifically, upon detecting an instruction that frequently leads to cache misses, the system sends a speculative request for the cache line to a lower level of the multi-level memory hierarchy prior to completing a full lookup operation in the initial cache. Preemptively sending the speculative request facilitates reducing the cache miss delay when the cache line is not available in the initial cache.

In some embodiments, the instruction is a load instruction.

In some embodiments, the system determines a predicted performance penalty associated with cache misses for the instruction, and determines whether to issue the pre-fetch request based on this predicted performance penalty.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, a full-custom implementation as part of an integrated circuit (or another type of hardware implementation on an integrated circuit), field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

Caching and Pre-fetching in Multi-Level Memory Hierarchies

A modern high-performance processor typically devotes large areas of semiconductor real estate to specialized hardware structures that cache frequently accessed data and speed up address translations. For instance, such specialized hardware structures may include multiple levels of SRAM (or DRAM) caches and multiple levels of translation lookaside buffers (TLBs), which cache page-table translations.

Figure 1:
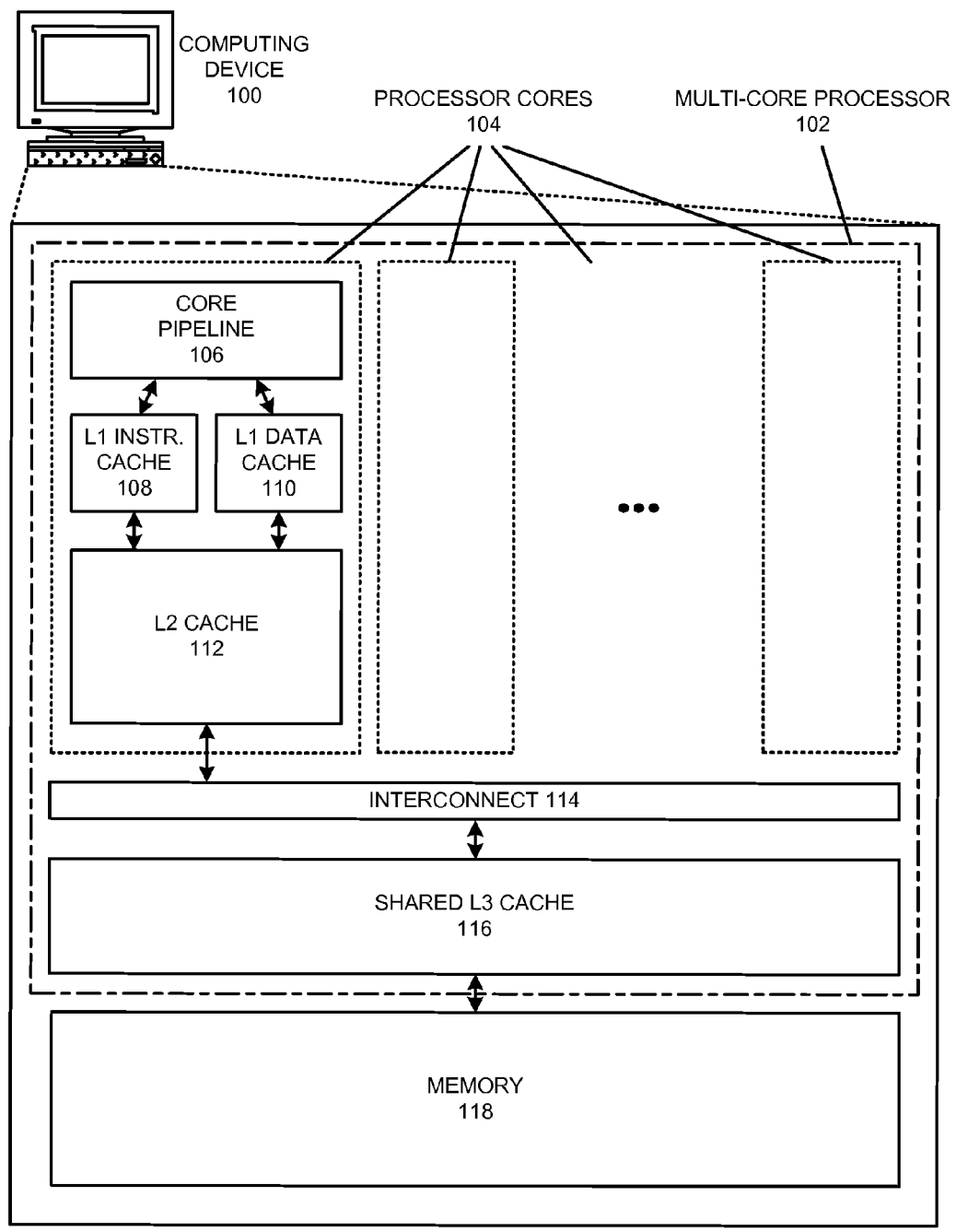
FIG. 1 illustrates an exemplary computing device that includes a multi-core processor with a set of structures for caching memory data in accordance with an embodiment.

For example, FIG. 1 illustrates an exemplary computing device 100 that includes a multi-core processor 102 with a set of structures for caching data. Multi-core processor 102 can include one or more processor cores 104, each of which includes one or more processor core pipelines 106, an L1 instruction cache 108 and an L1 data cache 110. Each set of L1 caches (108-110) is backed by an L2 cache 112. Processor cores 104 use interconnect 114 to access a shared L3 cache 116, which can load data from memory 118. Note that while FIG. 1 illustrates a multi-core processor architecture, the disclosed techniques can also be applied to single-core processor architectures.

When memory is referenced by an instruction executing in the core (e.g., a store instruction that is storing data in a cache, or a load or pre-fetch instruction loading data from the cache), the L1 data cache 110 (also referred to as the D$) is checked first. If the data is found in L1 data cache 110, it is loaded into the core pipeline 106. If the data is not found, a cache miss is signaled, and L2 cache 112 is accessed. If L2 cache 112 also misses, L3 cache 116 is accessed. If L3 cache 116 misses as well, then the data is fetched from the off-chip memory 118. Note that the memory hierarchy illustrated in FIG. 1 is exemplary, and different implementations may have additional cache levels as well as additional cache and TLB structures (not illustrated) that are shared across multiple processor cores. Also, inter-processor interconnect 114 may be placed at other (or multiple) levels of the memory hierarchy (e.g., other than and/or in addition to at the L2/L3 boundary), and some multiprocessors may include a hierarchy of such interconnects. For instance, in an exemplary multiprocessor, each processor core includes its own L1 caches, a first set of interconnect allows a "cluster" of two or more such processor cores to share an L2 cache, a second set of interconnect allows several such clusters to share an L3 cache, and additional interconnect between chips combines such grouped clusters into a larger multiprocessor.

In general, smaller caches located closer to the core pipeline (e.g., L1 caches) provide faster access times and consume less power than the larger caches (e.g., the L2 and L3 caches). For example, in some modern processors with three-level cache hierarchies (e.g., multi-core processor 102 illustrated in FIG. 1), data in the L1 caches can be accessed in a few processor cycles, while an L2 access takes on the order of 10-20 cycles, an L3 access generally takes over 20 cycles, and a memory access may involve 100s of cycles. Caches are typically sized in such a way that for most applications the L1 cache's hit rate is well over 50%, thereby reducing contention and power use in the lower levels of the memory hierarchy. However, memory references that cause cascading misses across every level of the memory hierarchy, while relatively infrequent, typically incur a large latency penalty.

Pre-fetching techniques try to hide the latency of cache misses by predicting which cache lines might be needed in the future and preemptively pre-fetching those cache lines. For instance, a compiler may identify data that will be needed in the future and can insert pre-fetch instructions into the program that pre-load the cache hierarchy with the needed data in advance, thereby averting a cache miss and associated pipeline stalls. Alternatively, a hardware pre-fetching unit may initiate pre-fetching operations on a cache miss. For example, when a load misses in the cache, the pre-fetch unit can predict that (based on spatial locality) the next few lines will likely be needed as well, and can issue pre-fetches for those lines.

For example, consider executing the pseudo-code of Table 1 on an in-order processor that stalls on a cache miss. In a situation where each array element occupies an entire cache line, in the worst case each load might result in a cache miss, thereby leading to long memory latencies. Some of this waiting time can be avoided by pre-fetching array elements upon encountering a load miss. For instance, if a given array [i] access misses, the processor may issue pre-fetch requests for array [i+1], array [i+2], array [i+3], and array [i+4]. Hence, if array [0] misses, when the loop reaches array elements 1, 2, 3, and 4, they will have already been pre-fetched, and will already reside in an on-chip cache. This style of pre-fetching, where the next n cache lines are pre-fetched on a cache miss, is called "next-n-lines pre-fetching." A common value for n is 4. Note that some pre-fetching techniques only pre-fetch data up to the lowest on-chip cache level (e.g., the on-chip cache farthest from the processor core), while other techniques pre-fetch data to intermediate cache levels or all the way up to the cache level closest to the processor core. Furthermore, some sophisticated pre-fetching techniques also track accesses in an attempt to detect strides or patterns in instruction loads. For example, pre-fetching units may be configured to detect access patterns that skip every second cache line, and in response only generate pre-fetch requests for every other cache line.

TABLE 1

```
for i = 0 .. 100 do:
    load array[i]
    sum = sum + array[i]
```

While, as described above, pre-fetching techniques can sometimes be used to avoid a subset of cache misses, pre-fetching techniques can also involve disadvantages. Because not all cache lines that are pre-fetched are used, pre-fetching can lead to higher energy consumption. For instance, in the previous example of Table 1, if array [100] leads to a miss, the hardware pre-fetching unit may pre-fetch array [101], . . . , array [104], which are then not actually used. Loading superfluous cache lines can lead to higher energy consumption in the off-chip memory, in the on-chip caches, and in the memory network. Hence, attempts to improve performance often need to consider trade-offs between energy consumption and the aggressiveness of pre-fetching.

Pre-fetching efforts may also "pollute" the cache hierarchy by displacing useful data, thereby potentially causing additional unexpected misses. Typically, when a cache line is loaded into an on-chip cache, some other cache line needs to be "evicted" to make space for the new line. Predicting which cache lines are not useful anymore is difficult, so sometimes the cache may evict a cache line that will then be accessed again almost immediately. In this situation, the pre-fetch causes another cache miss, and thus results in performance degradation.

Note that while pre-fetching is typically very effective for single-threaded, desktop workloads, pre-fetching techniques are generally less effective for multi-threaded, commercial workloads. Commercial workloads are characterized as having a large number of threads and/or processes that can exploit the parallelism of commercial (multi-threaded, multi-core) architectures. First, while low memory locality in commercial workloads results in high cache-miss rates, much of the performance loss of such misses can be mitigated by parallelism (e.g., much of the miss latency for one thread will hopefully be hidden by scheduling another thread). Second, in commercial workloads the interleaved execution of threads makes predicting when a cache line will actually be needed much more difficult; if data is pre-fetched too early, it might be evicted before it is used, while if the data is pre-fetched too late the impact of the cache miss delay is unmitigated. Third, because caches are shared among all threads, overly aggressive pre-fetching has a higher likelihood of evicting cache lines that will be needed by other threads in a short timeframe. Fourth, detecting patterns in the cache miss stream becomes more difficult, because the stream of misses come from different, uncorrelated threads. All of these issues negatively affect the performance of pre-fetching.

Thus, while pre-fetching techniques can help reduce cache misses in some situations, they also have some potential drawbacks and incur additional overhead. For instance, simulations of 8-threaded commercial workload benchmarks show that next-4-lines pre-fetching can lead to over 50% more loads (compared to no pre-fetching) and can at times even reduce performance as measured in instructions-per-cycle (IPC). Furthermore, estimating that caches account for 10%-20% of total processor power, increasing the dynamic power consumed by caches can lead to a substantial increase in the total power of a modern power-constrained processor.

Embodiments of the present invention seek to improve the efficiency of pre-fetching efforts by categorizing load instructions based on their past miss rates, and then using these categorizations to filter pre-fetch requests in a manner that reduces the power and bandwidth overhead associated with pre-fetching while preserving performance. Furthermore, in situations where additional cache traffic can be tolerated, the described techniques can further improve performance by using these categorizations to selectively issue speculative loads to one or more additional levels of the memory hierarchy.

Filtering Pre-Fetch Requests

While the actual set of memory references generated by a program are application-specific, a small set of instructions typically account for a high percentage of cache misses. For instance, in many applications most load instructions either miss infrequently in the L1 cache (e.g., less than 10% of times they are issued), or almost always miss in the L1 cache (e.g., over 90% of times they are issued). Some embodiments of the present invention identify miss-prone load instructions, and then reduce pre-fetching overhead by filtering pre-fetches based on a load's likelihood to miss. For instance, upon encountering a cache miss, a processor first checks if the particular load instruction being executed frequently leads to misses. If so, the processor issues pre-fetch requests for the next few predicted cache lines. For loads that seldom miss, the processor assumes that the current miss is an outlier, and does not issue any pre-fetch requests. Selective pre-fetching can substantially reduce the overhead of pre-fetching while preserving many of the performance benefits of unfiltered pre-fetching.

In some embodiments, the processor tracks the number of times a load instruction hits or misses in the first-level cache. This information can then be used when executing the instruction to determine whether a pre-fetch request should be sent. For instance, the processor may include hardware counters that track the hit and miss rates for each load instruction (e.g., by uniquely tracking each load instruction and its respective counter based on the load instruction's program counter). Such counters may take a range of forms including, but not limited to, one or more of the following: separate hit and miss counters; a single (per-instruction) "saturating" counter that is incremented on hits and decremented on misses (where, when the counter reaches a maximum value, it remains at that maximum value until a miss is encountered); and/or an asymmetric counter that weighs hits and misses differently (e.g., a counter that is incremented by a value n whenever a load hits in the cache, and is decremented by a value m whenever the load instruction misses in the cache). Note that hit and miss rates can also be tracked using the combination of a counter that tracks the number of times an instruction is executed and either a hit or a miss counter. For example, if a set of counters tracks the number of executions and the number of misses for a program instruction, the system can calculate the number of hits for that program instruction by subtracting the number of misses from the number of executions.

The number of counters needed to track hit and miss rates for multiple load instructions may vary depending on the application being executed. For example, as with branch predictors, a processor may be provisioned with a fixed set of counters that can be used to track a limited moving window of recent load instructions. Because of spatial and temporal locality, even a small number of counters may suffice to reduce pre-fetch overhead. In some embodiments, counters may be configured to work upon a per-cache-line granularity instead of a per-instruction granularity. For instance, the system may allocate a 3-bit counter per instruction cache line; having a per-cache-line counter reduces the amount of counters needed, but may lead to some inaccurate predictions because different load instructions that access different cache lines may share the same counter.

In some embodiments, the system may use an instruction miss list (IML), which is a small table of recent loads that missed in a cache. Entries in the IML record the number of times a load has been executed and the number of cache misses that have occurred when executing the load. Instructions are added to the IML on misses, and evicted from the IML using an LRU (least-recently-used) strategy. For instance, in some embodiments, when the IML becomes full, the load instruction with the lowest miss ratio may be evicted. Thus, a limited set of tracking resources can be focused on the most-likely-to-miss load instructions. Note that IMLs may vary in size, and that the threshold used to determine whether an instruction is considered likely-to-miss may be adjustable.

Note that in all of the above-described tracking techniques, the system may use a range of techniques when encountering a new instruction that has not been tracked. For instance, upon encountering a new load instruction that has resulted in a cache miss but has not been assigned a counter, the system may perform one or more of the following: issue one or more pre-fetch requests in an attempt to minimize possible load delay; not issue any pre-fetch requests for untracked load instructions until sufficient tracking data has been gathered; and/or use aggregated data from previous tracked and/or untracked load instructions to determine whether or not to issue one or more pre-fetch requests upon encountering a cache miss for the untracked load instruction.

In some embodiments, the system may perform a range of calculations based on the tracked values. For instance, the system may compute the difference between a hit counter and a miss counter when determining whether a load instruction is likely to miss. Alternatively, the system may perform more complex calculations when determining whether to send pre-fetch requests. For example, the system may calculate the ratio of misses to hits for a given load instruction that has led to a cache miss, and then compare this value to a range of thresholds to determine a suitable course of action. In one specific example, if the calculated value for the ratio of misses to hits is below a first threshold (e.g., 0.5), the system does not send any pre-fetch requests. If the value is between the first threshold and a second threshold (e.g., 1.0 for the ratio of misses to hits), the system may only send pre-fetch requests if the memory network utilization is low. However, if the value is above the second threshold, the system sends pre-fetch requests regardless of the memory network utilization.

In some embodiments, the pre-fetching system tracks instruction hits and misses for multiple levels of the memory hierarchy (e.g., the L2 cache, L3 cache, etc), and also uses that information to decide whether to issue pre-fetch requests. The pre-fetching system may also decide which cache level to pre-fetch into based on memory network utilization and/or counter values. For instance, in some situations, pre-fetching requests may result in data being brought into only the lowest-level on-chip cache (e.g., an L3 cache). While such pre-fetches do not completely avoid higher-level cache misses, they can substantially reduce the miss latency penalty (e.g., the cache miss latency for data accessed from an L3 cache is much less than that of a full memory access). In other situations, pre-fetched data may be loaded into multiple levels of the cache hierarchy. In some embodiments, such targeting decisions may be based on the tracked hit/miss likelihood for the current memory reference instruction and/or other tracked metrics.

Figure 2:
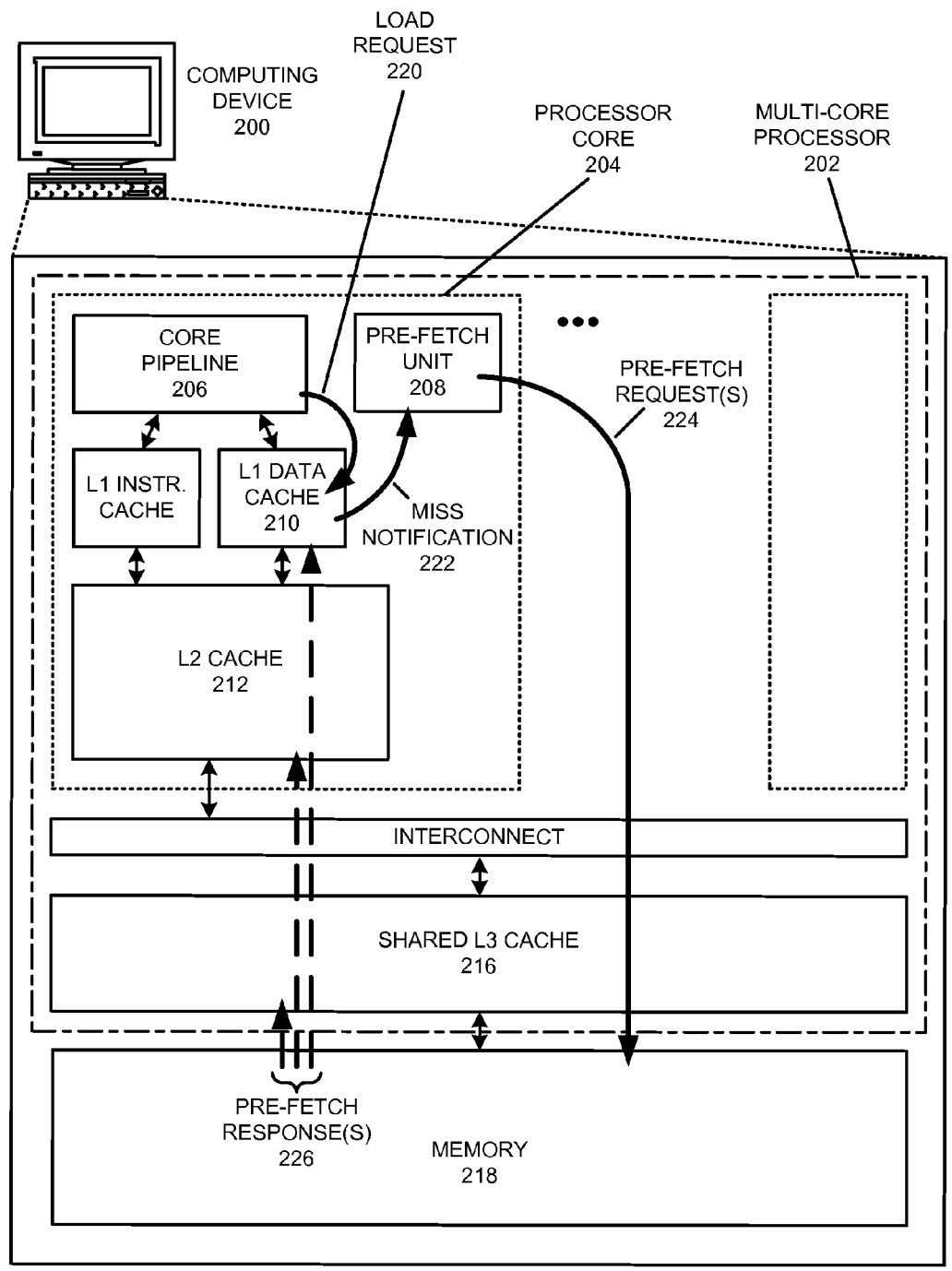
FIG. 2 illustrates an exemplary pre-fetch request operation in a computing device with a multi-core processor that filters pre-fetch requests to reduce pre-fetching overhead in accordance with an embodiment.

FIG. 2 illustrates an exemplary pre-fetch request operation in a computing device 200 with a multi-core processor 202 that filters pre-fetch requests to reduce pre-fetching overhead. Processor core 204 includes a set of one or more hardware counters (not shown) that are used to track instruction hit and miss rates for the memory hierarchy. More specifically, in this example, a hit counter is incremented every time a load instruction hits in the L1 cache, and a miss counter is incremented every time a load instruction misses in the L1 cache. Note that instructions and their respective counters can be uniquely identified by the instruction's program counter.

During operation, processor core 204 issues a load instruction for an address A in core pipeline 206 (e.g., load request 220). If the load hits in L1 data cache 210, processor core 204 updates the hit counter appropriately. If load request 220 misses in L1 data cache 210, processor core 204 updates the miss counter, and a hardware decision circuit determines whether to issue a pre-fetch request. For instance, upon encountering the miss, L1 data cache 210 may send a miss notification 222 to a pre-fetch unit 208 that then checks the difference between the miss counter and the hit counter. If the difference between the miss counter and the hit counter is greater than some threshold $t_1$, pre-fetch unit 208 assumes that subsequent loads will also miss, and issues one or more pre-fetch requests 224 for additional cache lines to memory 218. Pre-fetch unit 208 may also include logic that determines the cache lines to be pre-fetched. For example, based on previous access trends pre-fetch unit 208 may use either a next-4-lines pre-fetch technique or determine an alternative pre-fetch technique (and/or interval) using a more sophisticated stride or pattern detector.

Note that while the above description discloses calculating the difference between the two counters, the system may instead (or additionally) use a ratio or some other function of the tracked values to determine whether to send pre-fetch requests. Note also that core pipeline 206 may also track hit and miss values for additional levels of the memory hierarchy (e.g., for L2 cache 212 and shared L3 cache 216) as well as memory network utilization information, and may then use such tracked data to determine which cache level pre-fetched data should be loaded into. For example, pre-fetch unit 208 may specify the target cache level in pre-fetch request 224, so that pre-fetch response(s) 226 sent from memory 218 are loaded into the specified target caches.

In some embodiments, values tracked in the counters are used by a hardware decision circuit to determine whether pre-fetch requests should be sent when a load instruction issues and misses. In alternative embodiments, the system may use hints and analyses provided by software techniques to determine when to issue pre-fetch requests. For instance, the system may use a compiler to perform program analysis to identify load instructions that are likely to cause cache misses. The compiler can mark such instructions during compilation (e.g., using a one bit marker in an instruction field or a special instruction opcode). A processor detecting such an instruction can take this recommendation and issue one or more pre-fetch requests in response to a cache miss, or can view the recommendation as an additional factor in its own internal decision-making process (e.g., focusing limited hardware tracking resources on load instructions that have been marked by the compiler). Alternatively, in some embodiments, the compiler, upon determining a frequently missing load instruction, may also already add additional explicit pre-fetch instructions during compilation.

Note that software techniques can also be extended to make use of the hardware tracking data described above. For instance, the system may first execute a program for profiling purposes, and can store the hit and miss data tracked in hardware counters. This profiling data can then be fed back into the compiler, which analyzes the profile data to more accurately identify likely cache misses and outputs an updated program executable that includes marked instructions.

In some embodiments, the system may also use tracking techniques to track the performance penalties associated with cache misses. For instance, on an out-of-order processor, all cache misses might not be equally detrimental. For example, some cache misses may be inconsequential because the processor is able to find other instructions that can execute while waiting for data to be delivered from lower levels of the memory hierarchy; other cache misses could cause the processor to stall completely. Additional tracking infrastructure could, instead of (or in addition to) tracking cache hits and misses, also track whether instructions were executed without performance penalties (e.g., the instruction hit in the cache or the processor was able to continue executing without stalling while the cache miss was being processed) or caused performance penalties (e.g., lead to stalls). In some embodiments, the combination of miss-rate and performance-degradation tracking information could be used to determine which load instructions merit pre-fetching. For example, in some configurations pre-fetch requests may only be sent for instructions that frequently lead to cache misses that are typically associated with significant performance penalties. Note that such additional tracking capabilities may involve adding additional hardware structures into the processor that facilitate determining which load instructions lead to critical (performance-impacting) cache misses.

In some embodiments, cache lines that are loaded into a cache as a result of a pre-fetch request are tagged. This tagging allows pre-fetched cache lines to be identified during subsequent accesses, and prevents hit and miss statistics from being erroneously influenced by pre-fetched data. For instance, a pre-fetch unit may be configured to not increment a hit counter when a load instruction hits on a pre-fetched cache line. Cache policies may also weigh tagged cache lines differently when choosing lines to discard from a cache.

In some embodiments, tagging may also be used to identify the last cache line that was pre-fetched by a previous set of pre-fetch requests (e.g., in next-4-lines pre-fetching, the last pre-fetched cache line would be the fourth cache line). In these embodiments, the processor can issue additional pre-fetch requests when the tagged cache line is accessed, thereby ensuring that the next set of data has been loaded by the time it is needed.

Figure 3:
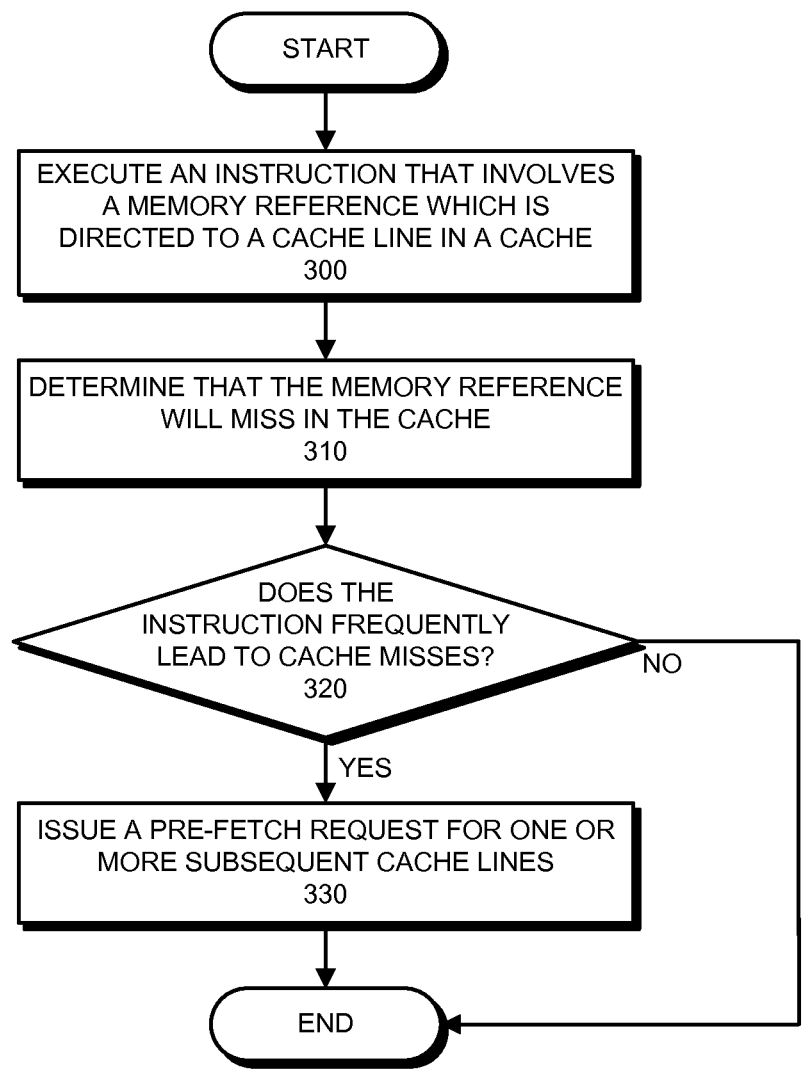
FIG. 3 presents a flow chart illustrating the process of filtering pre-fetch requests to reduce pre-fetching overhead in accordance with an embodiment.

FIG. 3 presents a flow chart that illustrates the process of filtering pre-fetch requests to reduce pre-fetching overhead. During operation, the system executes an instruction that involves a memory reference which is directed to a cache line in a cache (operation 300). Upon determining that the memory reference will miss in the cache (operation 310), the system determines whether the instruction frequently leads to cache misses (operation 320). If so, the system issues a pre-fetch request for one or more subsequent cache lines (operation 330). Otherwise, the process ends. Filtering pre-fetch requests based on instructions' likelihood to miss reduces pre-fetching overhead.

Note that the described techniques store the past hit/miss behavior of an instruction instead of storing the past usefulness of a pre-fetch request, and then checking whether a particular pre-fetch address was previously useful when issuing a subsequent pre-fetch for that address. Techniques which filter based on specific pre-fetch history require changes to data load mechanisms, as the system needs to tag each pre-fetched cache line and then track whether pre-fetched cache lines were actually used. In contrast, the disclosed embodiments instead track the likelihood-to-miss of memory references, and do not require tracking which pre-fetched cache lines are used.

Sending Speculative Cache Requests

In some embodiments, selective pre-fetching techniques can be combined with techniques that seek to reduce the cache miss delays associated with cascading misses by simultaneously sending additional speculative requests to lower levels of the memory hierarchy.

A multi-level cache hierarchy is typically structured such that a majority of memory references hit in the upper levels of the cache hierarchy. (Note that in this document "lower" in the memory hierarchy refers to caches closer to the main memory, and the highest level of the memory hierarchy is the L1 cache). However, as described above, a small set of instructions typically account for a high percentage of cache misses, and the memory references that miss can involve substantial additional delay. Instructions which miss frequently in an L1 cache are also likely to miss in lower levels of the memory hierarchy, and thus have a very high associated miss delay. Some embodiments of the present invention reuse the tracked miss data (described above) used for pre-fetch request filtering to also initiate preemptive, speculative fetches that reduce associated cache miss delays.

Some embodiments of the present invention identify instructions that are likely to miss in one or more cache levels, and then simultaneously issue speculative requests to one or more levels of the memory hierarchy to reduce cache miss latency. Issuing a speculative request to a lower level of the memory hierarchy can reduce the cascading miss effect by expediting the loading of desired data into lower levels of the memory hierarchy. For instance, when executing a load instruction, a processor can use the gathered data to make an educated guess as to whether the load is likely to hit or miss in the L1 cache. If the instruction is likely to miss, load requests can be sent to both the L1 and L2 cache hierarchies in parallel, thereby immediately initiating the loading of the needed data from the L2 cache into the L1 cache (e.g., instead of waiting until after the L1 cache has missed to send a request to the L2 cache). Note that a range of tracking and profiling techniques (such as those described above) may be used to make such educated guesses. Furthermore, aspects of these techniques may be incorporated into a processor, one or more components of the memory hierarchy, and/or a compiler.

In some embodiments, the speculation system tracks the number of times a memory access instruction (e.g., a load, pre-fetch, or store instruction) hits or misses for a cache level. This information can then be used when executing the instruction to determine whether a speculative request should be sent. For instance, the processor and/or components of the memory hierarchy may include hardware counters (as described above) that track instruction hit and miss rates for each level of the memory hierarchy (e.g., for an L1 cache, an L2 cache, an L3 cache, and main memory).

Note also that, as described for pre-fetches above, the system may use a range of techniques when encountering a new instruction that has not been tracked. For instance, upon encountering a new load instruction that has not been assigned a counter, the system may perform one or more of the following: issue a speculative load in an attempt to minimize possible load delay; not issue a speculative load for untracked instructions; and/or use aggregated data from previous tracked and/or untracked instructions to determine whether or not to issue a speculative load for the untracked instruction. Furthermore, as also described above, the system may perform a range of calculations based on the tracked values and a range of thresholds.

In some embodiments, the system can track hit and miss values for multiple cache levels, and send speculative requests to multiple cache levels based on the hit and miss counters for the different cache levels. For instance, if counters for both an L1 and an L2 cache indicate likely misses, the system may simultaneously send load requests to the L1, L2 and L3 caches. Speculative requests can also be issued to main memory as well if the counters indicate a miss in all cache levels. In some embodiments, the system may speculatively bypass some caches. For example, if the system predicts a very high likelihood of a miss in an L1 cache, the system may bypass the L1 cache and initially only send a speculative request to the L2 cache (e.g., to reduce power consumption in the L1 cache).

Figure 4A:
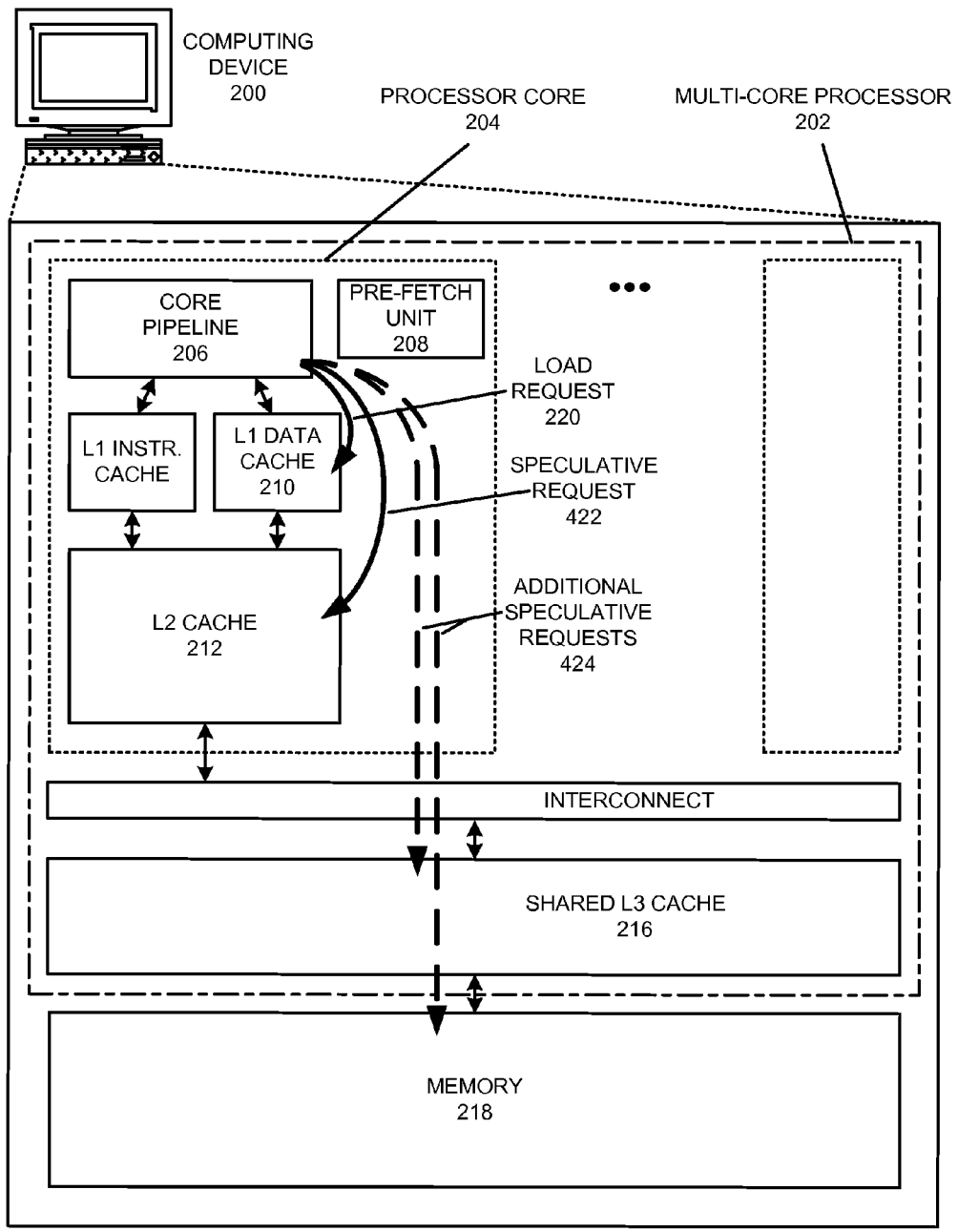
FIG. 4A illustrates an exemplary speculative request operation in a multi-core processor that uses speculative cache requests to reduce cache miss delays in accordance with an embodiment.

FIG. 4A illustrates an exemplary speculative request operation in the computing device 200 of FIG. 2. As described previously, processor core 204 includes a set of two hardware counters (not shown) that are used to track instruction hit and miss rates for the memory hierarchy. During operation, processor core 204 issues a load instruction for an address A in core pipeline 206. Core pipeline 206 checks the counters for this load instruction; if this is the first time the load instruction is executed, core pipeline 206 initializes the counters to a known value. If the difference between the miss counter and the hit counter is smaller than some threshold $t_1$, core pipeline 206 assumes that the load will hit again in L1 data cache 210, and the load proceeds normally by sending a load request 220 to L1 data cache 210 (i.e., no speculative request is sent to L2 cache 212). However, if the difference between the miss counter and the hit counter is greater than some threshold $t_1$, core pipeline 206 assumes that the load will miss again in L1 data cache 210, and simultaneously sends both a load request 220 to L1 data cache 210 and a speculative load request 422 for address A to L2 cache 212. Note that, while the above description discloses calculating the difference between the two counters, the system may instead (or additionally) use a ratio or some other function of the tracked values to determine whether to send speculative requests.

The request 422 sent to L2 cache 212 is considered speculative because L1 data cache 210 may actually already contain the data at address A, in which case speculative request 422 is spurious. If speculative request 422 was sent and load request 220 hits in L1 data cache 210, then speculative request 422 can be aborted or the returned data can be discarded. If load request 220 misses and no speculative request 422 was sent, a subsequent (now non-speculative) request will need to be sent to L2 cache 212 for address A. Once the requested data from address A is received, core pipeline 206 can update the hardware counters. If address A was found in L1 data cache 210, core pipeline 206 updates the hit counter for the load instruction; otherwise, the miss counter is updated.

Note that core pipeline 206 may also track hit and miss values for additional levels of the memory hierarchy (e.g., for L2 cache 212 and shared L3 cache 216), and may send additional speculative requests 424 to lower levels of the memory hierarchy if calculations indicate that lower levels of the cache hierarchy may also miss.

Figure 4B:
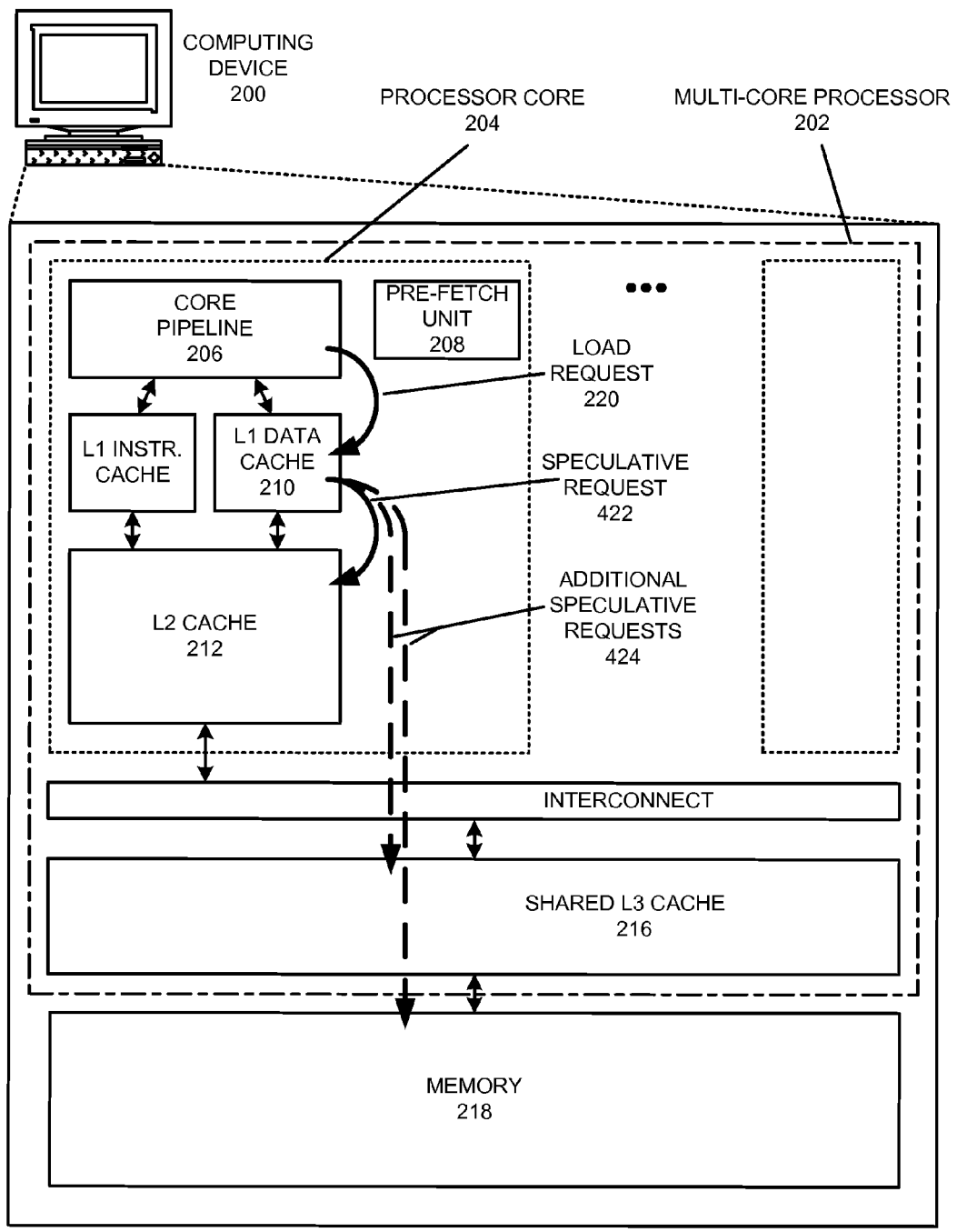
FIG. 4B illustrates an alternative exemplary speculative request operation in a multi-core processor that uses speculative cache requests to reduce cache miss delays in accordance with an embodiment.

Note also that, while FIG. 4A illustrates a scenario where core pipeline 206 maintains the counters and initiates speculative requests 422-424, other hardware structures may implement the tracking functionality and initiate speculative requests. For instance, in some embodiments one or more components of the memory hierarchy may initiate speculative requests (as illustrated in FIG. 4B, where L1 data cache 210 performs the tracking operations and issues speculative requests 422-424 to lower levels of the memory hierarchy). Some such components may not have access to the same set of information available at the processor level (e.g., may not be able to perform tracking on a specific per-instruction basis, unless such information is included in the request sent to the cache), but may still be able to perform tracking based on other information (e.g., by tracking the hit and miss rates for memory addresses being accessed instead of for instructions).

Figure 5:
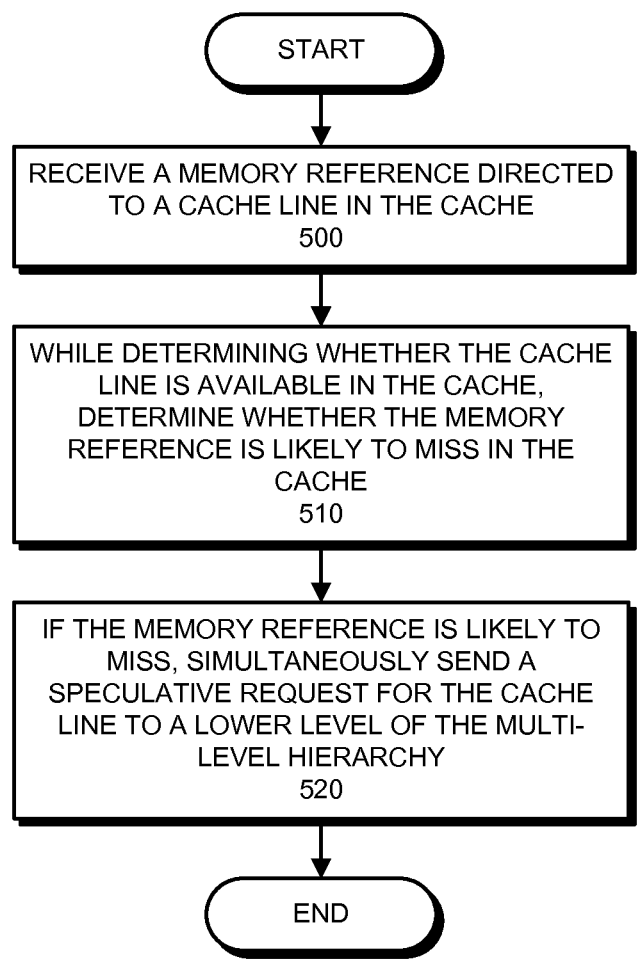
FIG. 5 presents a flow chart illustrating the process of using speculative cache requests to reduce cache miss delays in accordance with an embodiment.

FIG. 5 presents a flow chart that illustrates the process of using speculative cache requests to reduce cache miss delays for a cache in a multi-level memory hierarchy. During operation, the system receives a memory reference which is directed to a cache line in the cache (operation 500). While determining whether the cache line is available in the cache (but prior to completing a full cache lookup), the system determines whether the memory reference is likely to miss in the cache (operation 510), and if so, simultaneously sends a speculative request for the cache line to a lower level of the multi-level memory hierarchy (operation 520). Preemptively sending the speculative request reduces the cache miss delay when the cache line is not available in the cache.

While the preceding examples described a hardware decision circuit that uses counters, other techniques may maintain other data fields (e.g., arrays of hashed cache tag values, etc.) that facilitate quickly determining whether a cache is likely to miss for a given memory reference. Such techniques do not need to be 100% correct in speculatively identifying cascading misses to improve performance; however, to provide performance benefits they will typically need to: (1) be sufficiently accurate to improve performance and justify any additional hardware complexity and overheads (e.g., additional associated power consumption); and (2) reach a speculative decision before the full process of conclusively determining whether the memory process hits or misses in the cache completes.

As mentioned above in the context of pre-fetching, the system may use a range of techniques to decide whether to send a speculative request. In some embodiments, the system may use hints and analyses provided by software techniques (and/or a combination of hardware and software techniques) to determine when to issue speculative requests.

The actual performance improvements associated with speculative requests to lower levels of the memory hierarchy may vary (e.g., depending, in part, on cache and processor architecture and design goals). For instance, as described above in the context of pre-fetching overhead, power consumption is an increasingly important design factor (as opposed to only execution speed), and attempts to reduce power consumption can dramatically change cache organization. Traditional lookup techniques performed cache tag and array lookups in parallel, but cache array lookups may consume substantial power.

Hence, some modern caches perform the tag lookup first, and then only perform an array lookup when a tag match indicates that the data is actually available in the cache (and, for a multi-way cache, pinpoints the specific cache way containing the desired data, thereby sparing the cache from needlessly having to power up the circuits for all of the available cache ways). The benefits of techniques that use speculative requests (if sufficiently accurate) tend to increase as the number of cycles required for cache lookups (and misses) grows.

Note that sending speculative requests may increase power consumption (due to additional lower-level cache operations). However, as with pre-fetch filtering, if the system can successfully identify the small set of memory references that are likely to cause cache misses (and especially cascading cache misses), the performance benefits of such requests may outweigh the power costs. Furthermore, in some embodiments the system can be tuned to only selectively send speculative requests for instructions that are in the critical path of program execution. For instance, the system may only send speculative requests for memory references that the compiler has identified as being in a critical path and being very likely to cause a cascading miss, thereby using additional resources only in situations where there are clear benefits.

Caches located lower in the memory hierarchy tend to be highly interleaved and otherwise designed to support multiple requests from client caches (e.g., multiple higher-level caches), so additional speculative requests should not cause substantial additional contention in lower-level caches. In some embodiments, lower-level caches may signal their load level to higher-level caches, which may then reduce the number of speculative requests when load levels are high. Alternatively, speculative requests may be marked in a manner that clearly distinguishes them from non-speculative requests, allowing lower-level caches to selectively drop lower-priority speculative requests when load levels are high (e.g., giving known misses higher priority). Note that, unlike pre-fetching techniques, the described techniques occur at the time of the actual memory access, and hence do not pollute any of the caches involved (i.e., the data being accessed will be used immediately).

Note also that the described techniques need to ensure that the cache coherence protocol can deal with speculation, and that cache consistency is maintained. For example, in the case of an inclusive L2 cache (e.g., where data cached in the L1 cache is guaranteed to also be in the L2 cache), simultaneous requests sent to the L1 and L2 caches are a non-issue; if the requested memory address was in the L1 cache, the value returned from the L2 cache does not affect cache coherency, and can be discarded. However, if a speculative technique bypasses the L1 cache and only sends a speculative request to the L2 cache, the system needs to ensure that a value returned from the L2 cache does not violate cache consistency (e.g., if newer data for the memory address is stored in the L1 cache, the value from the L2 cache is actually invalid).

In some embodiments, pre-fetch filtering and speculative loads may be selectively enabled or disabled. For instance, while previous work seems to indicate that pre-fetching techniques typically offer performance benefits for both traditional desktop workloads as well as commercial workloads, in some situations the benefits of such approaches may depend on the full ensemble of processes that are executing concurrently. Hence, an operating system may selectively enable pre-fetching filtering and/or speculative loads on a per-process basis.

In summary, embodiments of the present invention seek to improve the efficiency of pre-fetching efforts by categorizing memory reference instructions based on their past miss rates, and then using these categorizations to filter pre-fetch requests in a manner that offers the performance benefits of common pre-fetching schemes while consuming less cache and memory bandwidth (and thus less total power). Furthermore, in situations where additional cache traffic can be tolerated, the described techniques can further improve performance by also using these categorizations to selectively issue speculative loads to one or more additional levels of the memory hierarchy. Combined, these two techniques significantly reduce the additional cache access power typically associated with pre-fetching, while also reducing cache miss latency, thereby improving processor performance.

Computing Environment

Figure 6:
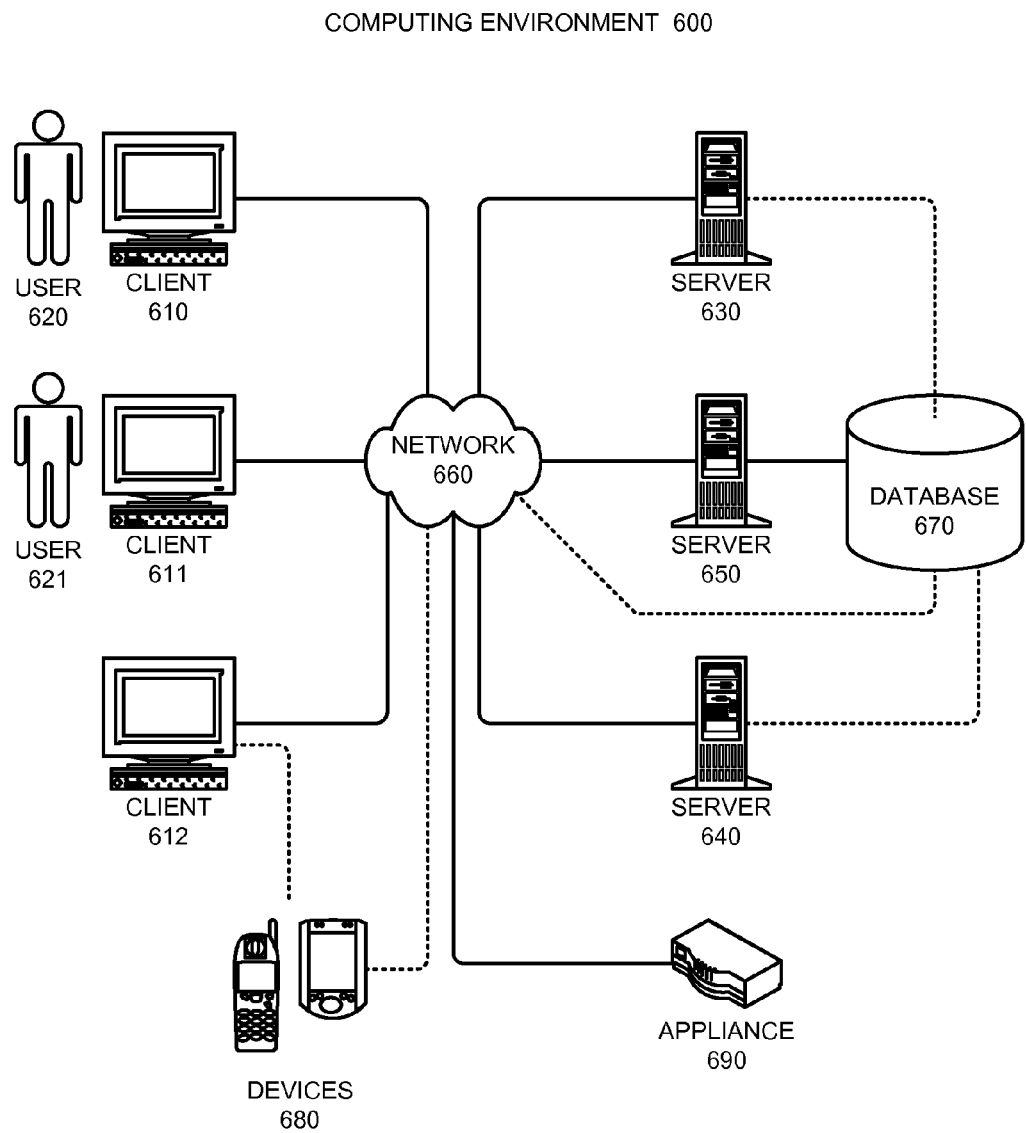
FIG. 6 illustrates a computing environment in accordance with an embodiment.

In some embodiments of the present invention, techniques for reducing pre-fetch overhead and cache miss delays can be incorporated into a wide range of computing devices in a computing environment. For example, FIG. 6 illustrates a computing environment 600 in accordance with an embodiment of the present invention. Computing environment 600 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 6, computing environment 600 includes clients 610-612, users 620 and 621, servers 630-650, network 660, database 670, devices 680, and appliance 690.

Clients 610-612 can include any node on a network that includes computational capability and includes a mechanism for communicating across the network. Additionally, clients 610-612 may comprise a tier in an n-tier application architecture, wherein clients 610-612 perform as servers (servicing requests from lower tiers or users), and wherein clients 610-612 perform as clients (forwarding the requests to a higher tier).

Similarly, servers 630-650 can generally include any node on a network including a mechanism for servicing requests from a client for computational and/or data storage resources. Servers 630-650 can participate in an advanced computing cluster, or can act as stand-alone servers. For instance, computing environment 600 can include a large number of compute nodes that are organized into a computing cluster and/or server farm. In one embodiment of the present invention, server 640 is an online "hot spare" of server 650.

Users 620 and 621 can include: an individual; a group of individuals; an organization; a group of organizations; a computing system; a group of computing systems; or any other entity that can interact with computing environment 600.

Network 660 can include any type of wired or wireless communication channel capable of coupling together computing nodes. This includes, but is not limited to, a local area network, a wide area network, or a combination of networks. In one embodiment of the present invention, network 660 includes the Internet. In some embodiments of the present invention, network 660 includes phone and cellular phone networks.

Database 670 can include any type of system for storing data in non-volatile storage. This includes, but is not limited to, systems based upon magnetic, optical, or magneto-optical storage devices, as well as storage devices based on flash memory and/or battery-backed up memory. Note that database 670 can be coupled: to a server (such as server 650), to a client, or directly to a network. In some embodiments of the present invention, database 670 is used to store information related to cache hit and miss likelihoods. Alternatively, other entities in computing environment 600 may also store such data (e.g., servers 630-650).

Devices 680 can include any type of electronic device that can be coupled to a client, such as client 612. This includes, but is not limited to, cell phones, personal digital assistants (PDAs), smartphones, personal music players (such as MP3 players), gaming systems, digital cameras, portable storage media, or any other device that can be coupled to the client. Note that, in some embodiments of the present invention, devices 680 can be coupled directly to network 660 and can function in the same manner as clients 610-612.

Appliance 690 can include any type of appliance that can be coupled to network 660. This includes, but is not limited to, routers, switches, load balancers, network accelerators, and specialty processors. Appliance 690 may act as a gateway, a proxy, or a translator between server 640 and network 660.

Note that different embodiments of the present invention may use different system configurations, and are not limited to the system configuration illustrated in computing environment 600. In general, any device that includes one or more caches in a memory hierarchy may incorporate elements of the present invention.

Figure 7:
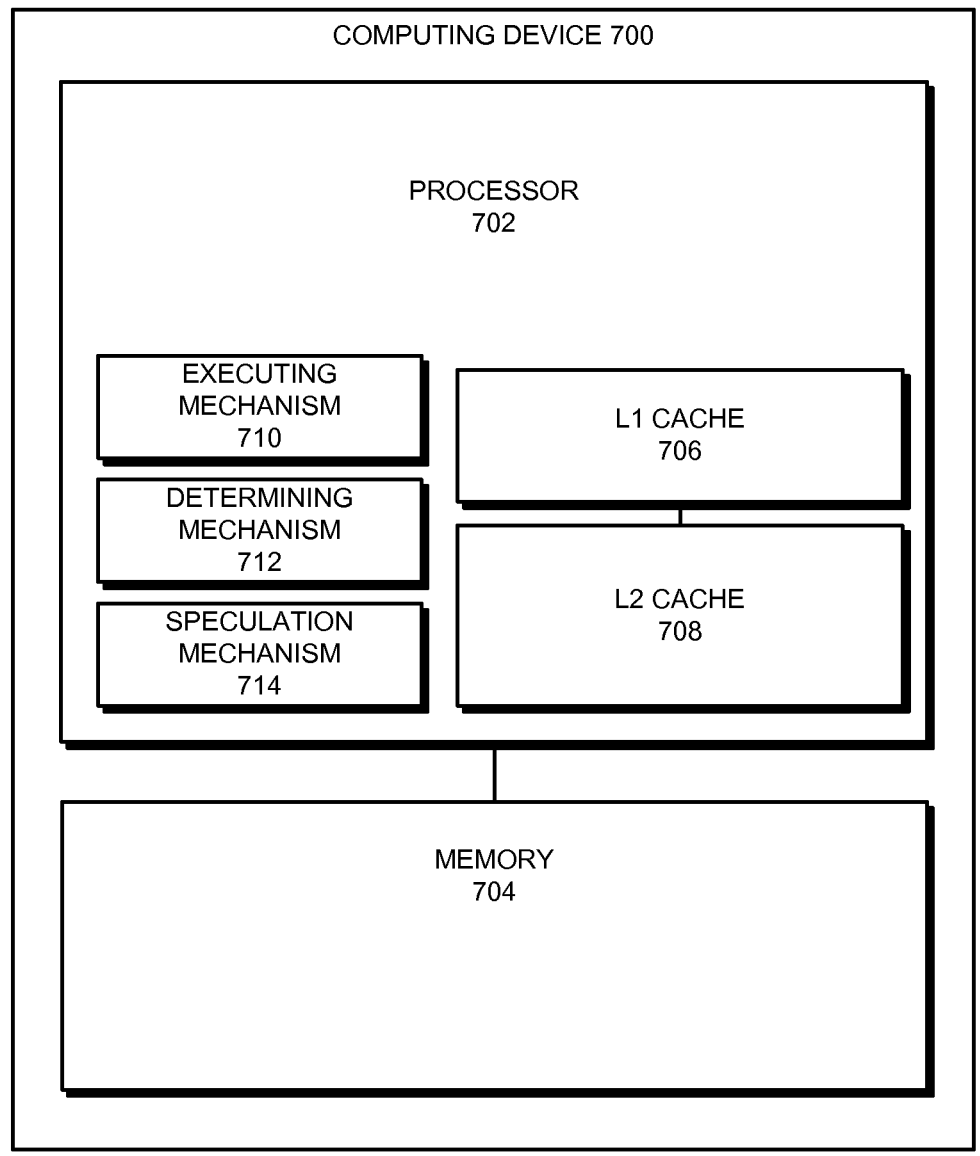
FIG. 7 illustrates a computing device in accordance with an embodiment.

FIG. 7 illustrates a computing device 700 that includes a processor 702 and a memory 704. Processor 702 includes an L1 cache 706 and an L2 cache 708; L1 cache 706, L2 cache 708, and memory 704 form a multi-level memory hierarchy for processor 702. Processor 702 also includes an executing mechanism 710, a determining mechanism 712, and a speculation mechanism 714. Computing device 700 uses executing mechanism 710, determining mechanism 712, and speculation mechanism 714 to filter pre-fetch requests in a manner that reduces pre-fetching overhead.

During operation, computing device 700 uses executing mechanism 710 to execute an instruction that involves a memory reference which is directed to a cache line (e.g., in L1 cache 706). Upon determining that the memory reference will miss in a cache, determining mechanism 712 determines whether the instruction frequently leads to cache misses. If so, speculation mechanism 714 issues a pre-fetch request for one or more subsequent cache lines to memory 704. Note that filtering pre-fetch requests based on instructions' likelihood to miss reduces pre-fetching overhead.

In some embodiments of the present invention, some or all aspects of executing mechanism 710, determining mechanism 712, and/or speculation mechanism 714 can be implemented as dedicated hardware modules in computing device 700. These hardware modules can include, but are not limited to, processor chips, application-specific integrated circuit (ASIC) chips, field-programmable gate arrays (FPGAs), memory chips, and other programmable-logic devices now known or later developed.

Processor 702 can include one or more specialized circuits for performing the operations of the mechanisms. Alternatively, some or all of the operations of executing mechanism 710, determining mechanism 712, and/or speculation mechanism 714 may be performed using general-purpose circuits in processor 702 that are configured using processor instructions. Also, while FIG. 7 illustrates executing mechanism 710, determining mechanism 712, and speculation mechanism 714 as being internal to processor 702, in alternative embodiments some or all of these mechanisms can be external to processor 702.

In these embodiments, when the external hardware modules are activated, the hardware modules perform the methods and processes included within the hardware modules. For example, in some embodiments of the present invention, the hardware module includes one or more dedicated circuits for performing the operations described below. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for filtering pre-fetch requests to reduce pre-fetching overhead, the method comprising:
    executing an instruction that involves a memory reference which is directed to a memory;
    determining a frequency of cache misses for the instruction from a tracked history of cache misses for the instruction;
    determining a frequency of performance penalties of the cache misses from a tracked history of performance penalties of the cache misses for the instruction;
    when the frequency of cache misses exceeds a threshold, filtering a pre-fetch request that is associated with the instruction; and
    otherwise, when the frequency of cache misses does not exceed the threshold:
        when the frequency of performance penalties exceeds a second threshold, causing at least a cache line to be pre-fetched by sending the pre-fetch request; and
        otherwise, filtering the pre-fetch request.

2. The computer-implemented method of claim 1,
    wherein issuing the pre-fetch request comprises detecting an access pattern for additional memory references following the instruction; and
    wherein selectively filtering the pre-fetch request based on the instruction's likelihood of a cache miss reduces pre-fetching overhead and cache power consumption.

3. The computer-implemented method of claim 1, wherein determining whether the instruction frequently triggers cache misses further comprises one or more of the following:
    receiving an indication associated with the instruction that memory references initiated by the instruction frequently miss in the cache; and
    using tracking data stored during the execution of a program to determine that the instruction frequently triggers misses in the cache.

4. The computer-implemented method of claim 3, wherein the method further comprises:
    performing profiling operations while executing the program on a processor to generate profiling information;
    analyzing the profiling information to identify that the instruction is likely to involve a cache miss; and
    modifying the instruction to indicate that the instruction is likely to involve a cache miss.

5. The computer-implemented method of claim 4,
    wherein modifying the instruction comprises marking a field in the instruction to indicate a likely cache miss;
    wherein a marked field indicates that the pre-fetching request should be issued when executing the instruction.

6. The computer-implemented method of claim 3, wherein tracking the number of cache misses for the instruction comprises:
    using a counter that counts a number of times that the instruction has executed; and calculating a difference between the counter and at least one of a miss counter and a hit counter for the instruction.

7. The computer-implemented method of claim 3, wherein tracking the number of cache misses for the instruction comprises:
using a counter that counts a number of times that the instruction has executed; and
calculating a difference between the counter and a saturating counter.

8. The computer-implemented method of claim 1, further comprising determining whether the number of cache misses exceeds a threshold by weighing previous misses differently than previous hits.

9. The computer-implemented method of claim 1,
wherein the cache is part of a multi-level memory hierarchy;
wherein upon determining that the instruction frequently leads to multi-level cache misses, a pre-fetch mechanism is configured to simultaneously send multiple speculative pre-fetch requests to multiple levels of the multi-level memory hierarchy in parallel to reduce lookup latency; and
wherein filtering the pre-fetch request comprises filtering two or more of the parallel multi-level requests.

10. The computer-implemented method of claim 1, wherein the instruction is a load instruction.

11. The computer-implemented method of claim 1,
wherein determining whether the instruction frequently leads to cache misses further comprises determining a predicted performance penalty associated with cache misses for the instruction; and
wherein the method further comprises determining whether to issue the pre-fetch request based on the predicted performance penalty.

12. A computer system that filters pre-fetch requests to reduce pre-fetching overhead, comprising:
a processor;
a cache; and
a memory;
wherein, while executing an instruction that involves a memory reference which is directed to the memory, the processor is configured to:
determine a frequency of cache misses for the instruction from a tracked history of cache misses for the instruction;
determine a frequency of performance penalties of the cache misses from a tracked history of performance penalties of the cache misses for the instruction;
when the frequency of cache misses exceeds a threshold, filtering a pre-fetch request that is associated with the instruction; and
otherwise, when the frequency of cache misses does not exceed the threshold:
when the frequency of performance penalties exceeds a second threshold, causing at least a cache line to be pre-fetched by sending the pre-fetch request; and
otherwise, filtering the pre-fetch request.

13. The computer system of claim 12,
wherein issuing the pre-fetch request comprises detecting an access pattern for additional memory references following the instruction; and
wherein selectively filtering the pre-fetch request based on the instruction's likelihood of a cache miss reduces pre-fetching overhead and cache power consumption.

14. The computer system of claim 12, wherein determining whether the instruction frequently triggers cache misses further comprises one or more of the following:
receiving an indication associated with the instruction that memory references initiated by the instruction frequently miss in the cache; and
using tracking data stored during the execution of a program to determine that the instruction frequently triggers misses in the cache.

15. The computer system of claim 12, wherein determining tracking the number of cache misses for the instruction comprises:
using a counter that counts a number of times that the instruction has executed; and
calculating a difference between the counter and at least one of a miss counter and a hit counter for the instruction.

16. The computer system of claim 12, wherein the cache is part of a multi-level memory hierarchy;
wherein the cache is part of a multi-level memory hierarchy;
wherein upon determining that the instruction frequently leads to multi-level cache misses, a pre-fetch mechanism is configured to simultaneously send multiple speculative pre-fetch requests to multiple levels of the multi-level memory hierarchy in parallel to reduce lookup latency; and
wherein filtering the pre-fetch request comprises filtering two or more of the parallel multi-level requests.

17. A processor that filters pre-fetch requests to reduce pre-fetching overhead, comprising:
a cache, wherein the cache is part of a multi-level memory hierarchy;
an executing mechanism that is configured to execute an instruction that involves a memory reference which is directed to a memory in the hierarchy, wherein the executing mechanism is configured to determine a frequency of cache misses for the instruction from a tracked history of cache misses for the instruction whether the instruction, wherein the executing mechanism is further configured to determine a frequency of performance penalties of the cache misses from a tracked history of performance penalties of the cache misses for the instruction; and
a pre-fetch mechanism that is configured to:
when the frequency of cache misses exceeds a threshold, filtering a pre-fetch request that is associated with the instruction; and
otherwise, when the frequency of cache misses does not exceed the threshold:
when the frequency of performance penalties exceeds a second threshold, causing at least a cache line to be pre-fetched by sending the pre-fetch request; and
otherwise, filtering the pre-fetch request.

18. The method of claim 3, wherein tracking the number of cache misses for the instruction comprises:
using a counter that counts a number of times that the instruction has executed; and
calculating a difference between the counter and a hit counter for the instruction, and
wherein the method further comprises, when the instruction hits on a pre-fetched cache line, not incrementing the hit counter for the instruction.

* * * * *